April 3, 1951         E. S. RITTNER         2,547,173
LONG WAVE LENGTH INFRARED RADIATION DETECTOR
Filed March 9, 1950
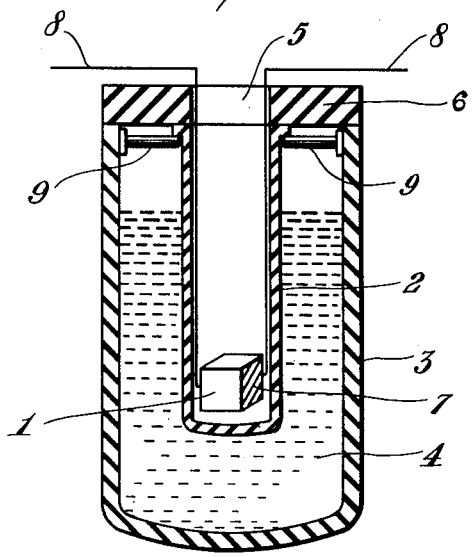
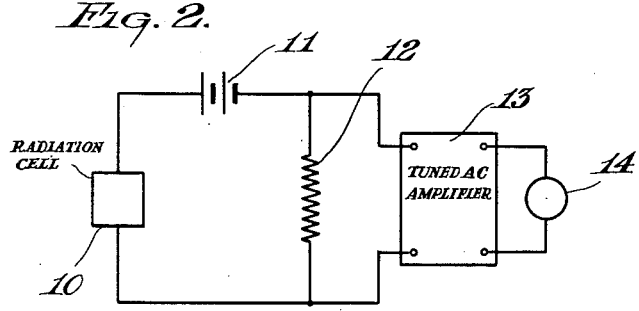
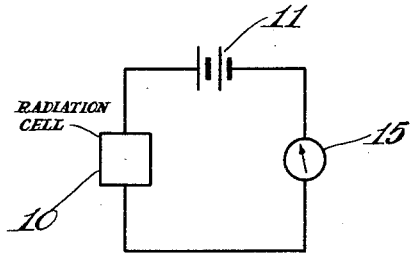
EDMUND S. RITTNER
INVENTOR.
BY *Fred M. Vogel*
AGENT.

Patented Apr. 3, 1951

2,547,173

UNITED STATES PATENT OFFICE 2,547,173

LONG WAVE LENGTH INFRARED RADIATION DETECTOR

Edmund S. Rittner, White Plains, N. Y., assignor to Philips Laboratories, Inc., Irvington on Hudson, N. Y.

Application March 9, 1950, Serial No. 148,693

5 Claims. (Cl. 201—63)

My invention relates to a quantum detector for detecting infra-red radiation of a wave-length up to about 30 microns, particularly to a detector for infra-red radiation having a wave-length between 8 and 15 microns.

Present quantum infra-red detectors such as PbS, PbSe, and PbTe are usually capable of detecting infra-red radiation having a wave-length up to about 5 to 6 microns. Since the maximum infra-red radiation emitted by a body at room temperature has a wave-length of about 10 microns, such detectors are incapable of detecting this type of radiation. The infra-red detector according to the present invention was devised in order to overcome this deficiency in present types of infra-red detectors and make it possible to detect the heat radiation emanating from relatively low temperature sources.

The infra-red detector according to the present invention will make it possible to detect radiation emanating from various bodies which by virtue of their temperature difference from that of their surroundings, behave either as sources or sinks of heat radiation. Moreover, by directing the detector, calibrated by means well known in the art, toward a warm body or other source of long wave-length infra-red radiation, the intensity of infra-red radiation emanating therefrom can be quantitatively measured since the detector measures the total heat energy per second received from the source along the viewing axis.

According to the invention, the infra-red detector comprises an impurity semi-conductor having a discrete energy level 0.04 to 0.06 electron volts (measured thermally) removed from a given energy band, i. e. either a filled discrete energy level 0.04 to 0.06 electron volts below the conduction band or an empty discrete energy level 0.04 to 0.06 electron volts above the full band. Further in accordance with the invention, the semi-conductor is maintained at a temperature substantially equal to that of liquid hydrogen so that the resistance of the semi-conductor may be affected by the infra-red radiation emanating from the heat radiator. In the preferred embodiment of my invention the detector comprises silicon suitably "doped" or modified by the inclusion in the crystal lattice of a minor addition of an element selected from group III or group V of the periodic table which element exhibits an atomic radius comparable to the atomic radius of an atom of silicon. Such elements are, for example, phosphorous and arsenic in group V and boron and aluminum in group III.

In the particular embodiment about to be described, a silicon sample which has been doped by the introduction of between $2\times10^{17}$ and $10^{18}$ atoms of boron per cm.$^3$ is employed. In the case of silicon doped with phosphorous the addition is between $5\times10^{16}$ and $2\times10^{17}$ atoms per cm.$^3$. Cf. Pearson and Bardeen, Phys. Rev. 75, 865 (1947) for experimental data on silicon samples doped with boron and phosphorous.

The invention will be described in connection with the accompanying drawing in which:

Fig. 1 shows a detector cell according to the invention;

Fig. 2 shows an A.-C. measuring circuit for measuring the output of the cell; and Fig. 3 shows a D.-C. measuring circuit for measuring the output of the cell.

In Fig. 1 a body about one cm. in length along the viewing axis and doped with between $2\times10^{17}$ and $10^{18}$ atoms of boron constitutes the detector element and is positioned at the base of a rather long insulating tube or container 2 which is contained or supported in an outer vessel or flask 3 partially filled with liquid hydrogen 4. Escape means (not shown) are provided to release hydrogen evaporated during the operation of the cell. The purpose of the long central tube is to effectively shield the cell unit 1 from any source of infra-red radiation except that entering window 5 so that the cell unit sees only the radiation from the heat radiator. The window 5 is made of a material transparent to infra-red radiation such as rock salt and is kept as cold as possible, for example, by directing at the window a stream of air precooled by liquid oxygen. Alternatively, the window can be mounted below the level of liquid hydrogen in the outer container but due to the mechanical difficulties involved, the indicated construction is to be preferred. The inner tube is filled with helium to prevent condensation of the components of the atmosphere due to the extremely low temperature prevailing therein.

The outer container is sealed off by a cover 6 provided with escape means for the evaporating hydrogen.

The silicon body is plated on opposite faces transverse to the face receiving the incident radiation with metal contacts 7 and electrical connections provided thereto by leads 8 extending through the window seal and into the inner tube. Alternatively the wires may be led and sealed through the walls of containers 2 and 3. The inner tube is supported within the outer flask or container by mounting brackets 9 or other conventional mounting means.

With the foregoing arrangement, the cell unit 1 is maintained at a surrounding temperature of liquid hydrogen and sees surrounding walls at only that temperature. The purpose of cooling the window is to reduce the amount of radiation emanating therefrom and by employing a relatively long tube, the effect of any radiation emitted therefrom at even those low temperatures is minimized.

The length of the inner tube (and of course the outer container) is determined by the angle of view to be subtended by the cell unit in viewing the radiator. In order to view completely a large radiator at a relatively short distance, the tube length must be shortened; whereas in viewing a distant radiator with a low radiation level, the length of the tube may accordingly be increased, which has the advantage of lowering the effect of radiation emitted by the window.

It may be advantageous to modulate the radiation from the source by any known means, for example, by a light chopper thus producing a modulated signal from the cell which can be detected independently of the unavoidable thermal radiation of the window. It may furthermore be desirable to cool the chopper in the same manner that the window is cooled to minimize the radiation emanating therefrom.

Figs. 2 and 3 show two representative circuits for measuring the output of the cell. Fig. 2 shows an arrangement suitable for use with a modulated signal, the A.-C. signal appearing across load resistor 12 is amplified by a tuned A.-C. amplifier 13. The output of the amplifier is supplied to a conventional measuring or recording apparatus 14. Battery 11 supplies a polarizing voltage for the cell 10.

Fig. 3 shows a measuring device suitable for use with unmodulated signals in which a galvanometer or similar D.-C. measuring instrument is connected in series with the battery 11 and the cell 10.

If the position of the heat radiator is searched by scanning with the detector the field in which the heat radiator is located, it may be desirable to apply the output of the cell to an ordinary impulse amplifier in preference to the circuits shown in Figs. 2 and 3.

Having thus described my invention in its preferred embodiment, I wish it to be understood that I am aware that the invention is capable of various modifications without departing from the spirit and scope thereof as defined in the appended claims.

What I claim is:

1. A detector for long wave-length infra-red radiation comprising an impurity semi-conductor having a discrete energy level 0.04 to 0.06 electron volts removed from a given energy band, means to maintain said semi-conductor at a surrounding temperature equal substantially to that of liquid hydrogen, means to expose one surface of the semi-conductor to a heat radiator emitting long wave-length infra-red radiation, and means to measure the change in conductance of said semi-conductor upon exposure of the said surface thereof to the heat radiator.

2. A detector for long wave-length infra-red radiation comprising a body of silicon containing as an impurity therein a quantity of an element selected from groups III and V of the periodic table which element has an atomic radius comparable to the atomic radius of silicon in an amount at which the silicon has a discrete energy level 0.04 to 0.06 electron volts removed from a given energy band, means to maintain said body of silicon at a surrounding temperature equal substantially to that of liquid hydrogen, means to expose one surface of the silicon body to a heat radiator emitting long wave-length infra-red radiation, and means to measure the change in conductance of the silicon upon exposure of the said surface thereof to the heat radiator.

3. A long wave-length infra-red detector comprising a body of silicon containing as an impurity about $2 \times 10^{17}$ to $10^{18}$ atoms of boron per cm.$^3$, means to maintain the silicon body at a surrounding temperature equal substantially to that of liquid hydrogen, means to expose one surface of the silicon body to a heat radiator emitting long wave-length infra-red radiation, and means to measure the change in conductance of the silicon upon exposure of the said surface thereof to the heat radiation.

4. A long wave-length infra-red detector comprising a body of silicon containing as an impurity about $5 \times 10^{16}$ to $2 \times 10^{17}$ atoms of phosphorous per cm.$^3$, means to maintain the silicon body at a surrounding temperature equal substantially to that of liquid hydrogen, means to expose one surface of the silicon body to a heat radiator emitting long wave-length infra-red radiation, and means to measure the change in conductance of the silicon body upon exposure of the said surface thereof to the heat radiator.

5. A long wave-length infra-red detector comprising a first sealed insulating container partially filled with liquid hydrogen, a second container supported within said first container and immersed in the liquid hydrogen, a window in the first container connecting with the second container and transparent to infra-red radiation of long wave-length defining an enclosed space within the second container, means to cool the window to a low temperature, a body of silicon containing as an impurity therein about $2 \times 10^{17}$ to $10^{18}$ atoms of boron per cm.$^3$, electrodes on opposite surfaces of the silicon body transverse to a surface which is exposed to the window, a gaseous filling in said container which is non-condensable at the temperature of liquid hydrogen, and means to measure the change in conductance of the silicon body upon exposure of the said surface thereof to a heat radiator.

EDMUND S. RITTNER.

No references cited.